Sept. 25, 1956 A. C. LUTHER, JR 2,764,686

FREQUENCY SYNCHRONIZING SYSTEMS

Filed May 18, 1954

INVENTOR.
ARCH C. LUTHER, JR.
BY
[signature]

United States Patent Office 2,764,686

Patented Sept. 25, 1956

2,764,686

FREQUENCY SYNCHRONIZING SYSTEMS

Arch C. Luther, Jr., Merchantville, N. J., assignor to Radio Corporation of America, a corporation of Delaware Application May 18, 1954, Serial No. 430,657

8 Claims. (Cl. 250—36)

This invention relates to a frequency control system and more particularly to an improved arrangement for synchronizing the oscillations of two electrical signal generators.

A composite video signal as generally transmitted by a television transmitter contains a video component, a synchronizing or sync component and a blanking component. The video component carries actual picture information, the sync component controls or synchronizes electron beam scanning of a picture, and the blanking component serves to turn off the electron beam scanning during the beam retrace period when no beam is desired. The sync component is composed of vertical sync pulses and horizontal sync pulses. The horizontal sync pulses control line scanning while the vertical sync pulses control field scanning. In the usual situation the synchronizing and the blanking components of the composite video signal are generated in a sync signal generator. Generally the sync signal generator is controlled by a master oscillator, and the master oscillator is in turn linked to a public utility power system. A signal taken from the public utility provides a frequency reference.

Improved techniques in video programming often include the use of two distinct program sources. With the use of two program sources the necessity of shifting from one program source to another creates an undesirable effect in the received picture unless the two program sources have their synchronizing components locked in phase. The undesirable effect is that the picture appears to roll over. This effect is created by requiring the receiver to adjust to a different set of synchronizing pulses.

Various other video programming techniques include the use of dissolves and superpositions. Such effects can only be successfully created if the two video programming sources used in the dissolve or superposition have synchronizing signals which are locked in synchronism. Systems to automatically lock in synchronism two sync pulse generators which require no manual operation have been devised. In an automatic system, synchronizing is generally accomplished by using two circuits. A first circuit provides frequency regulation and thereby adjusts the horizontal sync pulse frequency of a controlled or local sync signal generator in accordance with the frequency of a signal from a remote or controlling sync signal generator. A second circuit in the device then accomplishes phase synchronization of the vertical sync pulses. Broadly the frequency regulation is accomplished by generating a direct current control voltage which is proportional to the degree of frequency variation between the two signals and applying the control voltage to a frequency control circuit to control the frequency of the controlled sync signal generator. The controlled sync generator may be a local sync generator while the controlling sync generator may be a remote sync generator. The phase correction portion of the synchronizing system generally effects correction by forming a pulse which results from lack of coincidence when the vertical sync pulses of the two signals are out of phase. The coincidence pulse or correction pulse is then fed to the local sync signal generator and causes a predetermined phase shift in the oscillations of the local signal generator. In the frequency correction portion of the synchronizing circuit a coupling circuit for the direct current control voltage is provided. A typical system is shown and described in U. S. Patent No. 2,655,556, entitled "Synchronizing System," issued October 15, 1953, to Robert C. Ableson. In the event a long-time constant coupling circuit is used, lock-in of the frequency of the local sync signal generator to the frequency of the remote sync signal generator will be slow due to the inability of the control circuit to rapidly follow fluctuations in the direct current control voltage. If a short time constant correction circuit is used, the circuit becomes vulnerable to noise and random signals which may shift the local sync signal generator to an incorrect frequency.

The present invention in its more general form contemplates the use of a short-time constant coupling circuit between a control voltage generating circuit, and a frequency control circuit, to allow the frequency control circuit to readily follow voltage fluctuations of a voltage generated by the control voltage generating circuit during a period when the frequency of an oscillation generator being controlled by the frequency control circuit is undergoing substantial change. A circuit for lengthening the time constant of the coupling circuit operates when the oscillation generator is undergoing little change thereby rendering the frequency control circuit less responsive to random signals.

It is therefore an object of this invention to provide an improved frequency control system.

Another object of this invention is to provide a frequency control system having improved noise immunity with a wide lock in range.

Another object of this invention is to provide an improved system for maintaining synchronism between two oscillating signal generators.

Other and incidental objects of this invention will be apparent to those skilled in the art from reading the following specification and on inspection of the accompanying drawings in which.

Figure 1:
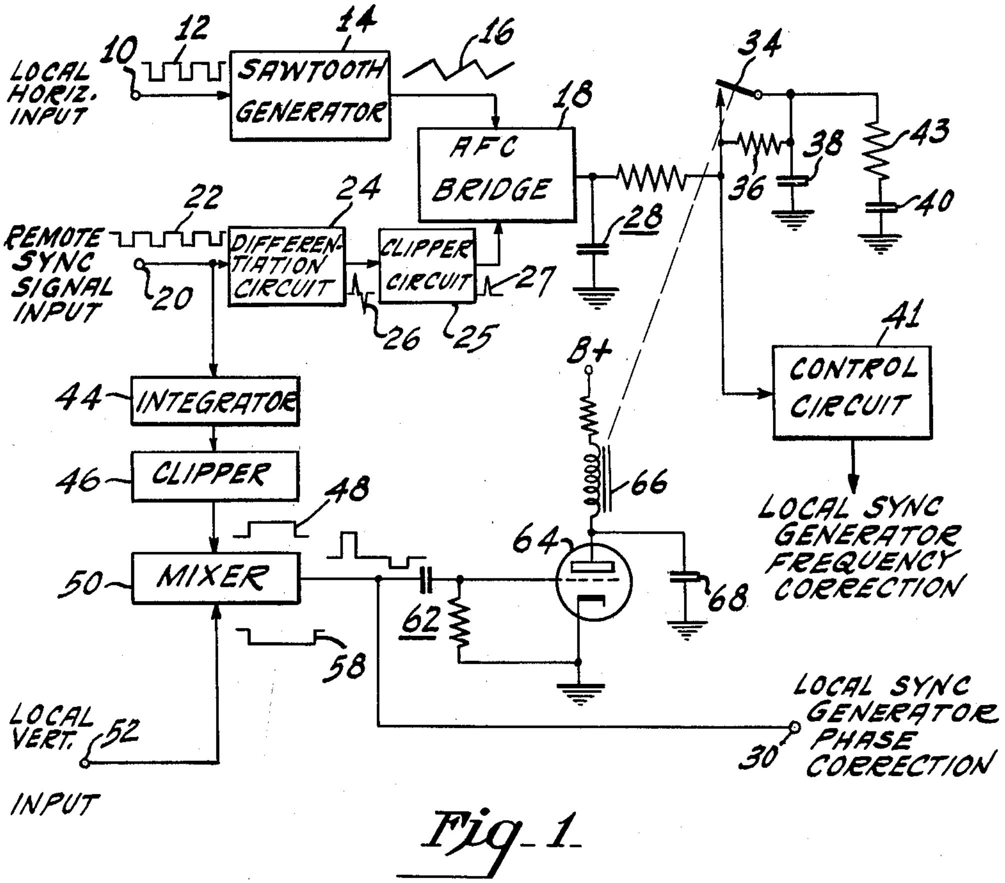
Figure 1 shows a circuit and block diagram which represents a form of the invention.

Referring to Figure 1 a local horizontal input terminal 10 is adapted to receive a signal from the local sync signal generator having all components removed except horizontal sync pulses 12. Local horizontal input terminal 10 is connected to sawtooth generator 14 wherein the horizontal pulses 12 are converted into a sawtooth wave 16. Remote sync signal input terminal 20 is adapted to receive a synchronizing component signal from a remote sync signal generator. A remote sync signal 22 from the remote sync generator is connected to a differentiating circuit 24 wherein sync signals 22 are differentiated to form differentiated pulses 26. The differentiated pulses 26 are then clipped in clipper circuit 25 to form pulses 27. The sawtooth wave 16 and the pulses 27 are fed to an automatic frequency control bridge 18. Such a frequency control bridge 18 is well known in the art and is described in the above referenced U. S. patent. The function of the frequency control bridge 18, is to generate a direct current control signal which varies as the frequency variation between the sawtooth wave 16 and the pulses 27. The direct current control signal from the automatic frequency control bridge 18 is connected by means of a resistance-capacitance coupling circuit 28 to a frequency control circuit 41. The frequency control circuit 41 may consist of a reactance tube and serves to vary the frequency of the local sync generator depending upon the magnitude of the direct current control voltage applied to it. Contacts 34 are adapted to switch resistor 36 and capacitor 38 into the coupling circuit between the frequency control bridge 18 and the frequency control circuit 41. A resistance 43 and a capacitance 40 are also connected such as to be controlled by contacts 34. A remote sync integrator circuit 44 is connected to receive remote sync signal 22. The remote sync integrator circuit 44 is connected to mixer 50 through remote sync clipper 46. A local vertical sync signal input terminal 52 adapted to receive a vertical synchronizing signal from the local sync signal generator is connected to the mixer 50. The mixer 50 is connected to couple its output both to a grid control circuit 62 and local sync generator phase correction terminal 30. Grid control circuit 62 feeds an electron discharge tube 64. The electron discharge tube 64 is connected to control the current which passes through a relay 66 which is in turn adapted to control the contacts 34.

Figure 2:
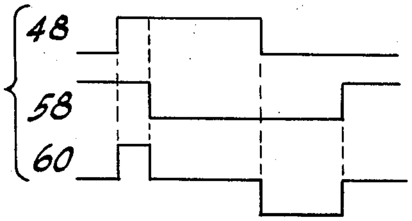
Figure 2 shows curves representative of waveforms of voltages generated within the circuit of Figure 1.

The operation of the apparatus of Figure 1 is substantially as follows:

The frequency of local horizontal sync pulses 12 is compared with the frequency of remote sync pulses 22, by means of the sawtooth generator 14, the differentiating circuit 24, the clipper circuit 25 and the frequency control bridge 18. The comparison results in a direct current control voltage which varies as the variation in frequency between the local sync pulses 12 and the remote sync pulses 22. The direct current control voltage is coupled to the control circuit 41 by means of short-time constant resistance-capacitance circuit 28. During a period when the frequency of the local sync pulses 12 does not coincide with the frequency of the remote sync pulses 22, it will be desirable to have a short-time constant coupling circuit between frequency control bridge 18, and the control circuit 41 in order that the control circuit 41 may readily follow the varying direct current control voltage. Once the frequencies are brought into synchronism it will be desirable to have a long-time constant coupling circuit replace the short-time constant circuit to render the control unit more immune to noise and other random signals. To provide the desirable longer time constant, once synchronism is attained, switch 34 operates to introduce capacitor 38 into the coupling circuit and thereby lengthen the time constant of the resistance-capacitance circuit 28. The resistor 36 is provided between the resistance-capacitance circuit 28 and capacitor 38 to charge the capacitor and thereby reduce the shock of sudden application of the capacitor 38 to the resistance-capacitance circuit 28. Consider now the method of operating contacts 34 to effect the desired switching operation. The local vertical sync signals and the remote vertical sync signals are fed to mixer 50 after being formed into single broad pulses 48 and 58. Figure 2 shows the pulses 48 and 58 which are fed to mixer 50. The local pulse 48 and the remote pulse 58 are similar but of opposite polarity, and the remote pulse 58 is of slightly longer duration.

By considering Figure 2 it can be seen that if the leading edges of the two pulses 48 and 58 begin simultaneously no positive pulse will be formed, however, if there is a variation between the leading edges as shown in Figure 2, the summation of the two pulses 48 and 58 in the mixer 50 will result in a positive pulse and a negative pulse, as shown in the waveform 60. The positive portion of the waveform 60 may be utilized to shift the phase of the local sync generator and the connection for such a purpose may be made to the local sync generator phase correction terminal 30. The waveform 60 is also coupled to a control grid of the electron discharge tube 64. The tube 64 is connected to draw grid current upon the application of the positive portion of the waveform 60. The grid current action will cause the tube 64 to be non-conducting for most of the cycle and only a small current will pass through the relay 66. The small current caused by the short duration of the positive portion of the waveform 60 is insufficient to affect the relay 66, and a plate condenser 68 bypasses such currents to ground. Lack of current in the relay 66 will leave the contacts 34 in an open condition and therefore the coupling circuit between the frequency control bridge 18 and the control circuit 41 will be of short-time constant, consisting essentially only of the resistance-capacitance circuit 28. Consider now that the local sync signal and the remote sync signal approach phase synchronism. In such a case the leading edges of the local pulse 48 and the remote pulse 58 will approach coincidence and no positive portion will be generated by their addition in the mixer 50. As there is no positive portion to cause the tube 64 to draw grid current, the tube 64 will be in a conducting state. The current now carried by the tube 64 will pass through and energize the relay 66 thereby closing the contacts 34. The closing of the contacts 34 provides the addition of the capacitor 38 and its associated circuitry to the coupling circuit between the frequency control bridge 18, and the control circuit 41 and effects a long-time constant in the coupling circuit. The resistance 43 and the capacitance 40 modify the frequency characteristic of the long-time constant coupling circuit to provide the most stable circuit. It may therefore be seen that as the signals approach synchronism and are not being substantially varied, a long-time constant circuit is provided thereby rendering the circuit more immune to random signals.

Having thus described the invention, what is claimed is:

1. A system for maintaining synchronism between a first and a second sync generator comprising; a bridge circuit connected to said first sync generator and said second sync signal generator for generating a control voltage which varies as the variation in synchronism between said first and said second sync generators, a frequency control device connected to one of said signal generators for controlling the frequency of said one sync generator, a first-time constant circuit connected between said bridge circuit and said frequency control device, a second-time constant circuit, a pulse controlled phase synchronizing circuit for synchronizing the phase of said first and said second sync generators, a pulse controlled switch controlled by said phase synchronizing circuit for switching said second-time constant circuit between said bridge circuit and said frequency control device at a time when said first and said second sync generators are substantially in synchronism.

2. A device according to claim 1 wherein said pulse controlled phase synchronizing circuit comprises; a coincidence circuit for comparing the time duration of a first pulse with the time duration of a second pulse.

3. A device according to claim 1 wherein said pulse controlled switch comprises an electron discharge device having current control means, connected to a current controlled circuit interrupting device, said circuit interrupting device being controlled by a current under the control of said electron discharge device.

4. A frequency control system including, frequency control voltage generating means, a coupling circuit having a given time constant connected to the control voltage output terminals of said generating means, a frequency control circuit connected by said coupling circuit to said generating means, phase control voltage generating means, and means connected to said phase control voltage generating means and said coupling circuit and responsive to the phase control voltage to vary the time constant of said coupling circuit.

5. A frequency control system including, frequency control voltage generating means, a coupling circuit having a given time constant connected to the control voltage output terminals of said generating means, a frequency control circuit connected by said coupling circuit to said generating means, phase control voltage generating means, and means connected to said phase control voltage generating means and said coupling circuit and responsive to the phase control voltage to lengthen the time constant of said coupling circuit.

6. A frequency control system including, frequency control voltage generating means, a frequency control circuit, a series resistor and a shunt capacitor network interconnecting said generating means and said control circuit, phase control voltage generating means, an electron discharge device having an input circuit coupled to said phase control voltage generating means and an output circuit, a capacitor and means interposed in the output circuit of said electron discharge device arranged to connect said capacitor in shunt to said network.

7. A frequency control system including, frequency control voltage generating means, a frequency control circuit, a series resistor and a shunt capacitor network interconnecting said generating means and said control circuit, phase control voltage generating means, an electron discharge device having an input circuit coupled to said phase control voltage generating means and an output circuit, a capacitor, and a relay in the output circuit of said electron discharge device arranged to connect said capacitor in shunt to said network.

8. A frequency control system including, frequency control voltage generating means, a frequency control circuit, a series resistor and a shunt capacitor network interconnecting said generating means and said control circuit, phase control voltage generating means, an electron discharge device having an input circuit coupled to said phase control voltage generating means and an output circuit, a series circuit comprising a resistor and a capacitor shunted across said network, and a relay in the output circuit of said electron discharge device arranged to short circuit said resistor.

References Cited in the file of this patent

UNITED STATES PATENTS

| | | |
|---|---|---|
| 2,250,284 | Wendt | July 22, 1941 |
| 2,567,286 | Hugenholtz | Sept. 11, 1951 |